(12) United States Patent
Kojima et al.

(10) Patent No.: US 7,401,994 B2
(45) Date of Patent: Jul. 22, 2008

(54) SECURING CLIP

(75) Inventors: Tsutomu Kojima, Kanagawa (JP); Takashi Koike, Kanagawa (JP); Shinya Takashima, Kanagawa (JP)

(73) Assignee: Piolax, Inc., Yokohama-shi (JP)

( * ) Notice: Subject to any disclaimer, the term of this patent is extended or adjusted under 35 U.S.C. 154(b) by 0 days.

(21) Appl. No.: 10/773,573

(22) Filed: Feb. 9, 2004

(65) Prior Publication Data

US 2004/0228678 A1 Nov. 18, 2004

(30) Foreign Application Priority Data

Feb. 14, 2003 (JP) .................... P2003-036549

(51) Int. Cl.
*B25G 3/18* (2006.01)
(52) U.S. Cl. .................... 403/326; 24/289; 24/336; 24/458
(58) Field of Classification Search ............... 403/326, 403/329, 305; 24/289, 293, 297, 336, 458, 24/460; 292/302; 256/DIG. 4
See application file for complete search history.

(56) References Cited

U.S. PATENT DOCUMENTS

| | | | | |
|---|---|---|---|---|
| 3,858,370 | A * | 1/1975 | Halstead | 312/352 |
| 4,408,939 | A * | 10/1983 | Graff et al. | 411/112 |
| 5,347,690 | A * | 9/1994 | Mansoor et al. | 24/295 |
| 5,409,198 | A * | 4/1995 | Roick | 267/107 |
| 5,740,640 | A * | 4/1998 | Yasuda | 52/204.597 |
| 6,327,758 | B1 * | 12/2001 | Petrakis et al. | 24/546 |
| 6,691,374 | B2 * | 2/2004 | Coyne | 24/3.3 |

FOREIGN PATENT DOCUMENTS

JP 2002-195223 7/2002

\* cited by examiner

*Primary Examiner*—Daniel P. Stodola
*Assistant Examiner*—Joshua T Kennedy
(74) *Attorney, Agent, or Firm*—McGinn IP Law Group, PLLC

(57) ABSTRACT

A securing clip for securing the first panel member with the second panel member. The securing clip, being shaped like an S-character in cross section, includes a first fitting portion for fitting a holed end portion of the first panel member, and a second fitting portion for fitting a holed end portion of the second panel member. Each of the first fitting portion and the second fitting portion is formed with an engaging pawl engaging a hole at the end portion of the corresponding panel member on an inner wall face of its own, and the second fitting portion is formed with an engagement wall engaging a regulation wall provided on the second panel member.

9 Claims, 6 Drawing Sheets

SECURING CLIP

BACKGROUND OF THE INVENTION

1. Field of the Invention

The present invention relates to improvements in a securing clip for fastening and securing two panel members having a holed end portion, such as when a fender protector of the vehicle is secured to a fender panel.

2. Description of the Related Art

Though being not specifically illustrated, the conventional securing clip of this kind is an integral molding of synthetic resin, with the S-character cross section as a whole. If an end portion of the fender panel having a through hole is inserted from one opening, an engaging pawl corresponding to the through hole at the end portion engages therein. If an end portion of the fender protector having the same through hole is inserted from the other opening, an engaging pawl corresponding to the through hole at the end portion engages therein. Thereby, the fender protector is secured to the fender panel (e.g., refer to JP-A-2002-195223).

Accordingly, the conventional securing clip has an advantage that the fender protector is simply fixed to the fender panel, using the S-character shape of its own. However, when the fender protector molded of a flexible resin material undergoes a wind resistance while the vehicle is running fast, or a water resistance while running across a sump, the fender protector may be flexed, possibly giving rise to a phenomenon that the opening on the fitting portion for fitting the fender protector is opened, or the fender protector and the securing clip are distorted around the through hole at the end portion. Thereby, there was a fear that the fender protector might easily fall off the fender panel.

SUMMARY OF THE INVENTION

This invention has been achieved to effectively solve the above-mentioned problems associated with the conventional securing clip. The invention of aspect 1 provides a securing clip for securing a first panel member with a second panel member, the securing clip being like the S-character in cross section, including a first fitting portion having the U-character shape for fitting a holed end portion of the first panel member, and a second fitting portion having the U-character shape for fitting a holed end portion of the second panel member, characterized in that each of the first fitting portion and the second fitting portion is formed with an engaging pawl engaging a hole at the end portion of the corresponding panel member on an inner wall face of its own, and the second fitting portion is formed with an engagement wall engaging a regulation wall provided on the second panel member.

The invention of aspect 2 provides the securing clip according to aspect 1, characterized in that the engagement wall exists in bilateral symmetry around the hole at the end portion of the second panel member.

The invention of aspect 3 provides the securing clip according to aspect 1, characterized in that an engagement face of the engagement wall engaging the regulation wall is inclined with respect to a central axis of the hole at the end portion of the second panel member.

The invention of aspect 4 provides the securing clip according to aspect 2, characterized in that an engagement face of the engagement wall engaging the regulation wall is inclined with respect to a central axis of the hole at the end portion of the second panel member.

The invention of aspect 5 provides the securing clip according to aspect 1, characterized by further including a detachment grip portion for detaching the securing clip from the second panel member.

The invention of aspect 6 provides the securing clip according to aspect 2, characterized by further including a detachment grip portion for detaching the securing clip from the second panel member.

The invention of aspect 7 provides the securing clip according to aspect 3, characterized by further including a detachment grip portion for detaching the securing clip from the second panel member.

The invention of aspect 8 provides the securing clip according to aspect 1, characterized in that a rib wall is protruded on an inner wall face of the second fitting portion.

The invention of aspect 9 provides the securing clip according to aspect 2, characterized in that a rib wall is protruded on an inner wall face of the second fitting portion.

The invention of aspect 10 provides the securing clip according to aspect 3, characterized in that a rib wall is protruded on an inner wall face of the second fitting portion.

The invention of aspect 11 provides the securing clip according to aspect 4, characterized in that a rib wall is protruded on an inner wall face of the second fitting portion.

Accordingly, in the invention of aspect 1, the engagement wall formed on the second fitting portion is engaged with the regulation wall provided on the second panel member without causing a phenomenon of distortion between both, especially when the end portion of the second panel member is fitted into the second fitting portion of the securing clip. Even if the vehicle undergoes a wind resistance or water resistance, there is no fear that the second panel member falls off the first panel member.

In the invention of aspect 2, the engagement wall exists in bilateral symmetry around the hole at the end portion of the second panel member, thereby preventing the phenomenon that the securing clip and the second panel member are distorted, whereby there is no fear that the second panel member falls off the first panel member.

In the invention of aspects 3 and 4, the engagement face of the engagement wall is inclined with respect to the central axis of the hole at the end portion in the second panel member, there is a great wedge effect when the engagement wall is engaged with the regulation wall.

In the invention of aspects 5 to 7, the detachment grip portion is provided. Therefore, when the securing clip itself is detached from the second panel member, the operation is facilitated.

In the invention of aspects 8 to 11, the rib wall is protruded on the inner wall face of the second fitting portion, whereby the securing clip can be generally employed for the second panel member having different thickness without becoming rickety.

DETAILED DESCRIPTION OF THE PREFERRED EMBODIMENTS

Figure 1A:
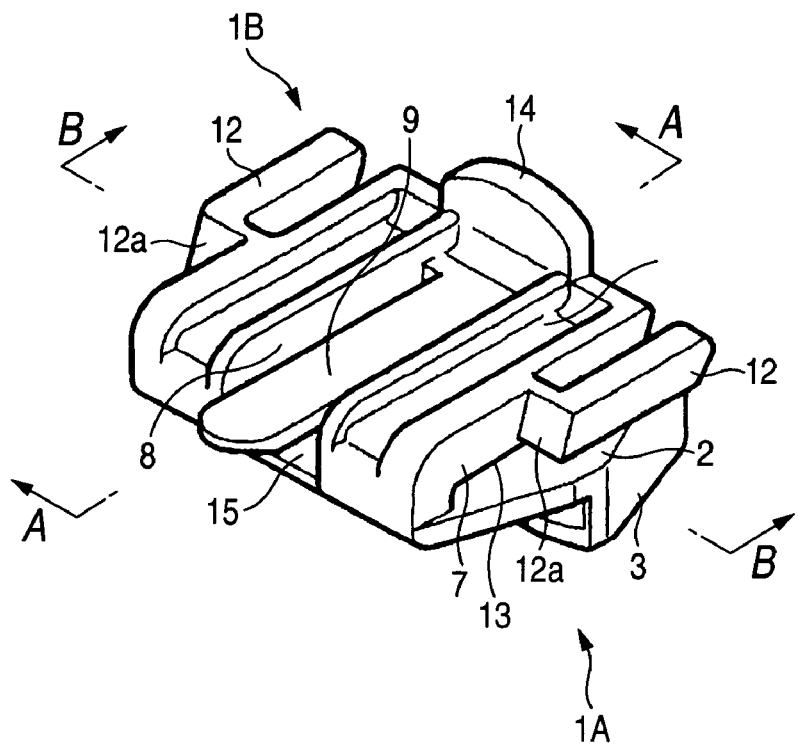
FIGS. 1A and 1B are perspective views showing a securing clip according to the present invention, from the fore side and the rear side.
Figure 1B:
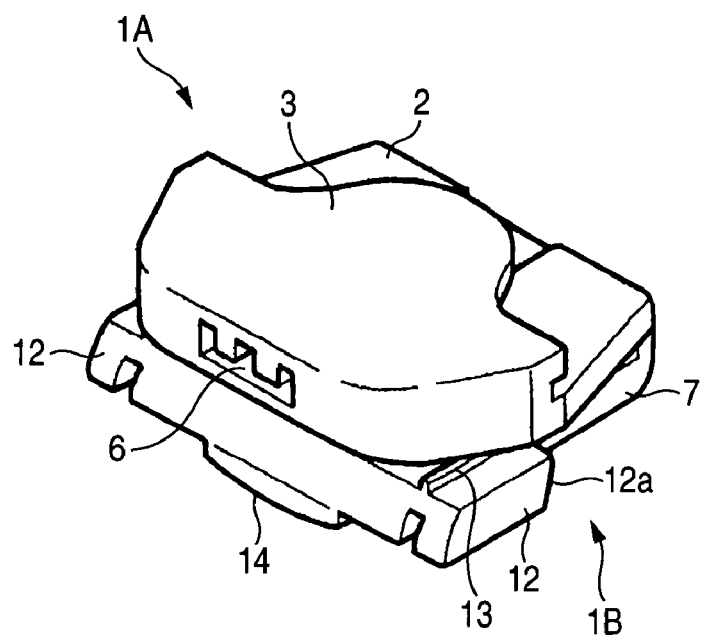

The preferred embodiments of the present invention will be described below in detail with reference to the accompanying drawings. A securing clip according to the invention has been developed as the clip for securing a fender protector to a fender panel of the vehicle. The securing clip is integrally molded of synthetic resin, like the S-character in cross section as a whole, and includes a first fitting portion 1A like the U-character in side view for fitting a holed end portion of the fender panel and a second fitting portion 1B like the U-character in side view for fitting a holed end portion of the fender protector, as shown in FIGS. 1A and 1B.

Figure 2A:
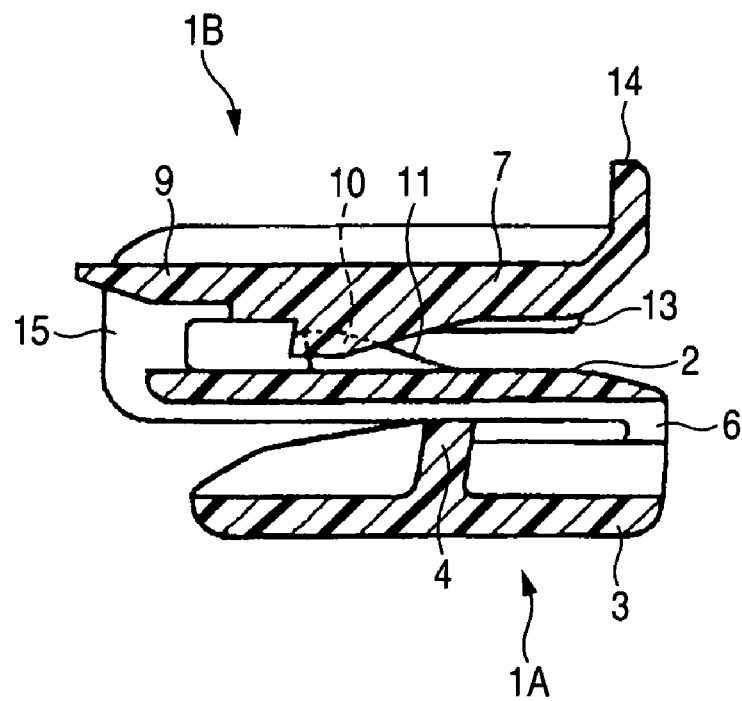
FIG. 2A is a cross-sectional view taken along the line A-A in FIG. 1A.
Figure 2B:
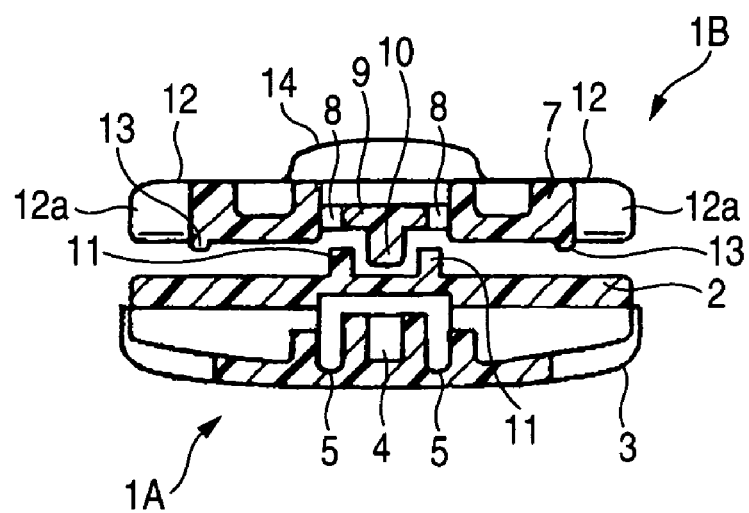
FIG. 2B is a cross-sectional view taken along the line B-B in FIG. 1A.

And the first fitting portion 1A of the former part is composed of a common board 2 and a lower plate 3 folded in parallel with a certain gap from one end of the board 2, in which an engaging pawl 4 for engaging an end through hole of the fender panel is formed on an inner wall face of the lower plate 3, a thin wall portion 5 is provided continuously on either side of the engaging pawl 4, and an opening 6 for containing the engaging pawl 4 is punched at a junction portion between the board 2 and the lower plate 3, as shown in FIGS. 2A and 2B. The circumferences of the board 2 and the lower plate 3 are linked like a half-bag.

The second fitting portion 1B of the latter part is composed of a common board 2 and an upper plate 7 folded in parallel with a certain gap from the other end of the board 2, in which a resilient wall piece 9 separated via a slit 8 and extending from an open end like the U-character in side view to the rear part is provided in a central part of the upper plate 7, an engaging pawl 10 is integrally formed on an inner wall face of the resilient wall piece 9 and a pair of engaging pawls 11 are integrally formed on an inner wall face opposed to the board 2, each engaging pawl 10, 11 being engaged into an end through hole of the fender protector from the vertical direction. Accordingly, when each engaging pawl 10, 11 is engaged into the end through hole of the fender protector, an upper engaging pawl 10 formed on the resilient wall piece 9 is located at the center of the end through hole, and a lower engaging pawl 11 formed on the board 2 is located in the end through hole sideways of the upper engaging hole 10 in a paired relation, in which the upper engaging pawl 10 and the lower engaging pawl 11 overlap close to one another vertically.

Moreover, in the second fitting portion 1B, one pair of engagement walls 12 engaging a regulation wall 18 of the fender protector 16 are formed bilaterally around the end through hole of the fender protector on both side edges of the upper plate 7 closer to the opening end, and one pair of thin rib walls 13 engaging into the concave grooves 19 of the fender protector 16 are protruded continuously on an inner wall face at the boundary between each engagement wall 12 and the upper plate 7, with a detachment gripping portion 14 integrally provided on an outside wall face at the opening end of the upper plate 7. An engagement face 12a engaging the regulation wall 18 of an engagement wall 12 is positively inclined around the central axis of the end through hole of the fender protector.

In addition, an opening 15 in communication to the slit 8 is punched at the junction portion between the board 2 and the upper plate 7, and one pair of engaging pawls 11 are formed on the board 2. Employing the opening 15 and the opening 6 of the first fitting portion 1A located oppositely the opening 15, the securing clip is molded using a mold is two-divided to the left and right, resulting in a simpler mold structure, as shown in FIG. 2A.

Figure 3A:
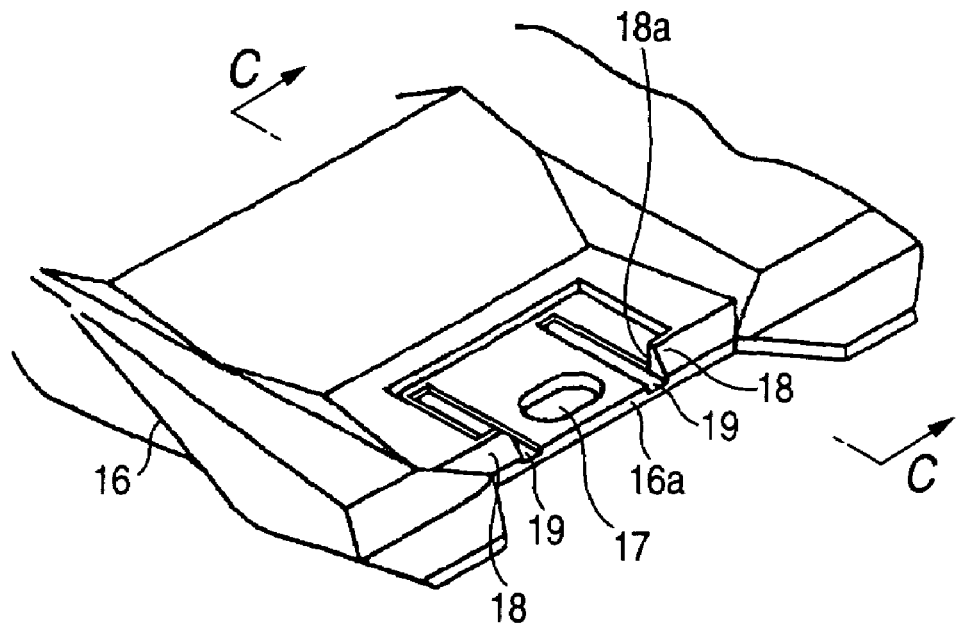
FIG. 3A is a perspective view of the essence showing the structure of a fender protector.
Figure 3B:
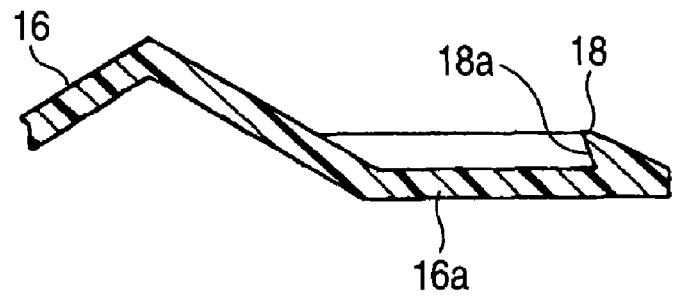
FIG. 3B is a cross-sectional view taken along the line C-C in FIG. 3A.

On the other hand, the fender protector 16 for use in this embodiment has one pair of regulation walls 18 engaging the engagement wall 12 that are integrally provided on both sides of an end portion 16a with a long through hole 17 sandwiched, and a concave groove 19 for enabling the rib wall 13 to be engaged is provided between each regulation wall 18 and the end through hole 17, as shown in FIGS. 3A and 3B. Also, an engagement face 18a engaging the engagement wall 12 of each regulation wall 18, like the engagement face 12, is positively inclined around the central axis of the end through hole 17 of the fender protector 16 and in parallel to the engagement face 12a, so that the engagement faces 12a and 18a are engaged with a wedge effect upon engagement with each other.

The fender panel 20, though not specifically shown, has a round through hole 21 punched at an end portion 20a in the same way as conventionally.

Figure 4:
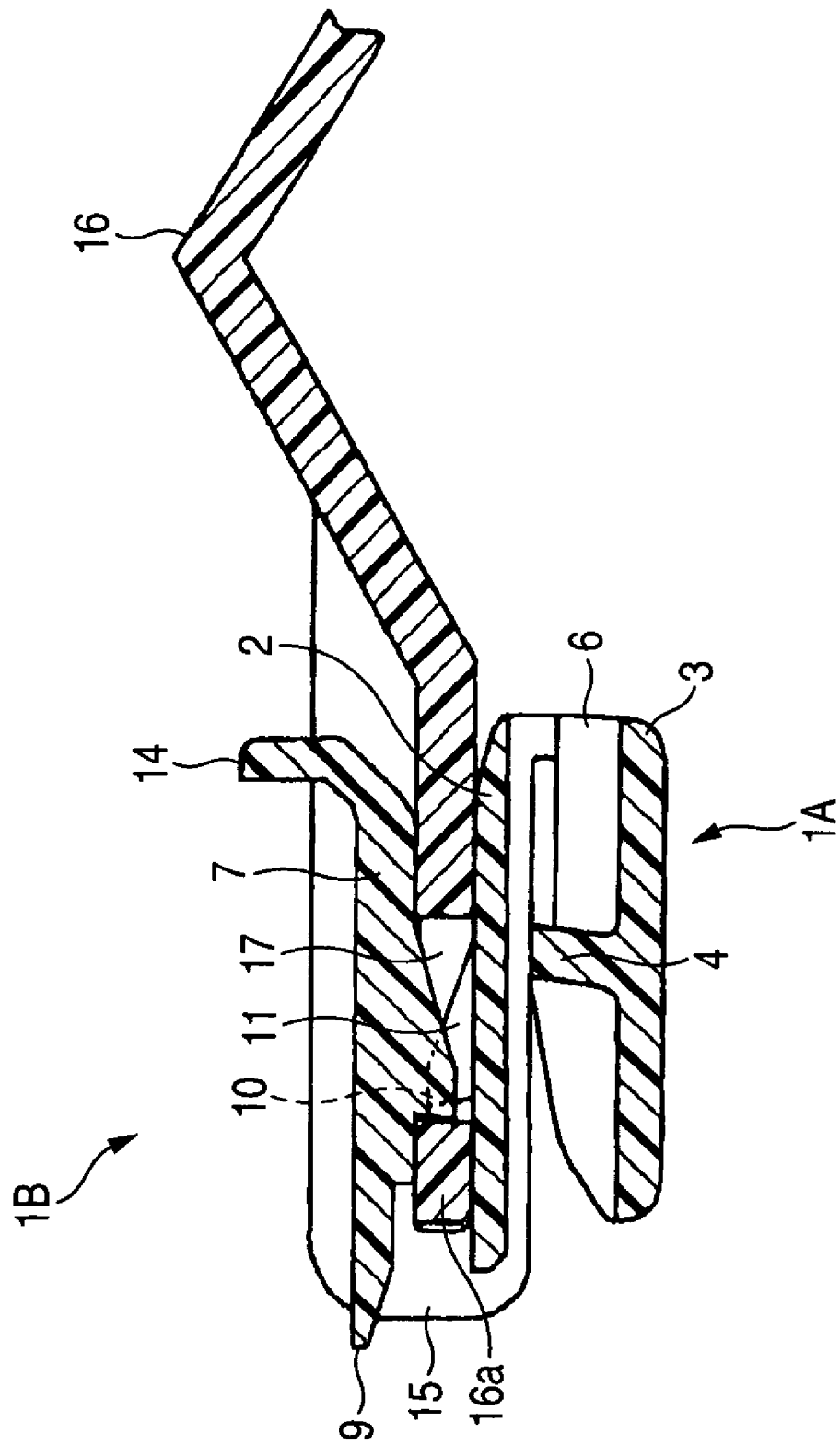
FIG. 4 is a cross-sectional view of the essence showing a state where the securing clip is attached to the fender protector.

Accordingly, when the fender protector 16 is fixed to the fender panel 20, employing the securing clip according to this embodiment, first of all, the end portion 16a with the through hole 17 for the fender protector 16 is fitted into the inside of the second fitting portion 1B smoothly while being guided by a taper face of each engaging pawl 10, 11, as shown in FIG. 4. At this time, while the upper plate 7 is being pressed apart, the upper engaging pawl 10 and the lower engaging pawl 11 that overlap engage the end through hole 17 of the fender protector 16 from the vertical direction, whereby the securing clip is attached to the fender protector 16 simply and tightly without slipping off.

Figure 5:
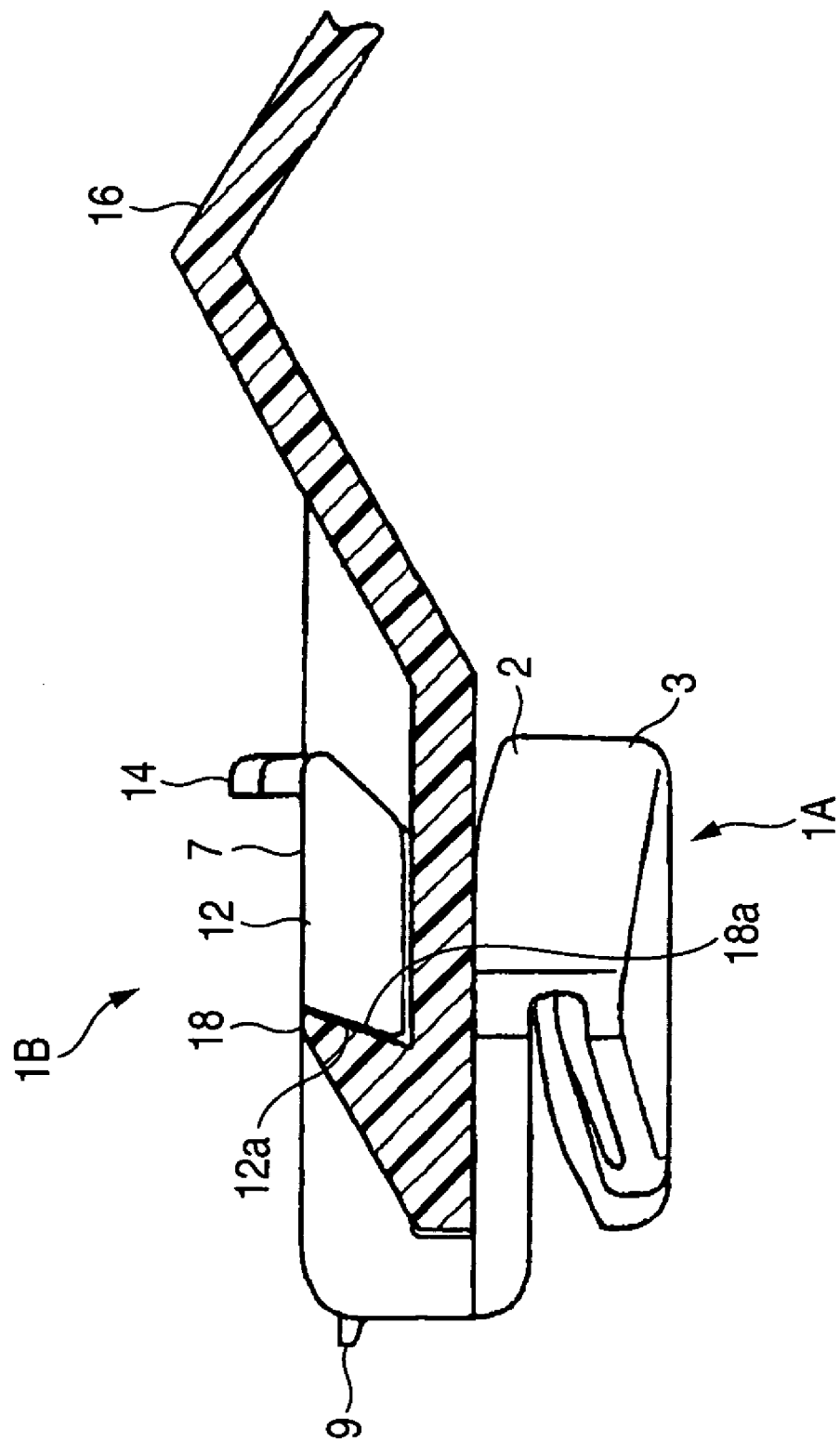
FIG. 5 is a cross-sectional view of the essence showing a state where an engagement wall engages a regulation wall.

And the rib wall 13 on the upper plate 7 engages in the concave groove 19 of the fender protector 16 in a state where the securing clip is attached to the fender protector 16, so that one pair of engagement walls 12 formed on the upper plate 7 resiliently strides over the regulation wall 18 corresponding provided on the fender protector 16, enabling the engagement faces 12a and 18a inclined around the central axis to be opposed and engaged, sufficiently giving rise to a wedge effect without easy disengagement between them, as shown in FIG. 5. Particularly, the rib wall 13 protruded on the upper plate 7 is generally employed for the fender plate 16 having different plate thickness by preventing a backlash effectively.

Figure 6:
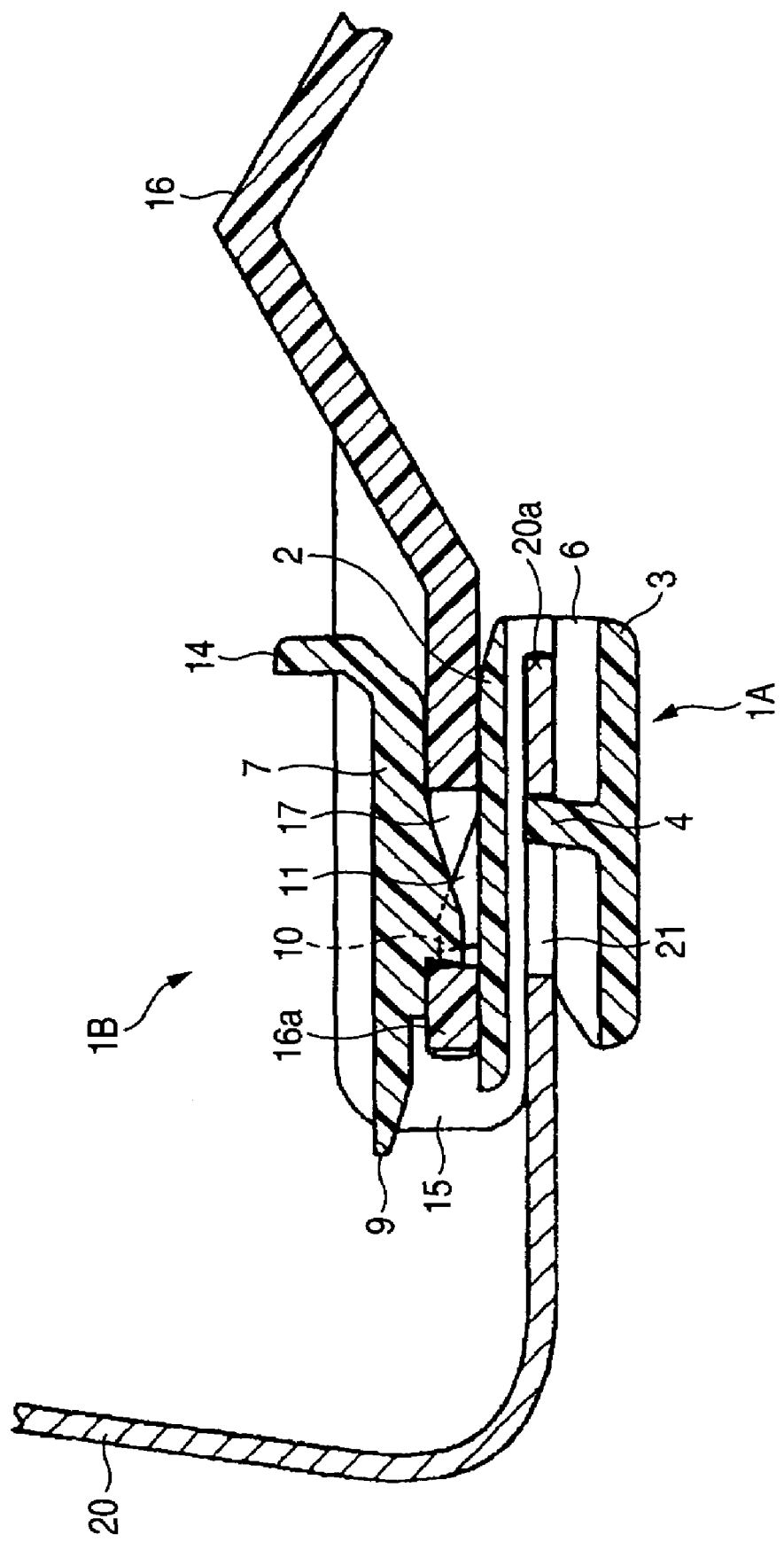
FIG. 6 is a cross-sectional view of the essence showing a state where an end portion of the fender protector is fixed to an end portion of the fender panel using the securing clip.

Thus, if an end portion 20a with a through hole 21 for the fender panel 20 is fitted into the inside of the first fitting portion 1A from the reverse direction, while being guided by a free end portion being greatly curved of the lower plate 3, whereby the fender protector 16 is firmly secured to the fender panel 20, as shown in FIG. 6. In this case, the engaging pawl 4 engages the end through hole 21 of the fender panel 20, there is no fear that the securing clip slips off the fender panel.

Accordingly, in this embodiment, three engaging pawls 10 and 11 overlap and engage the end through holes 17 of the fender protector 16 from the vertical direction, and the engagement wall 12 of the upper plate 7 is engaged with the regulation wall 18 on the fender protector 16 with a wedge effect, as previously described. Even if the fender protector 16 is flexed and complicated by undergoing a wind resistance while running fast or a water resistance while running across a sump, there is no phenomenon that the securing clip and the fender protector 16 are distorted around the end through hole 17, thereby preventing the fender protector from slipping off the fender panel 20 inadvertently.

When the securing clip is detached from the fender panel 20, the top end of a tool such as a driver is inserted from the side of the free end portion on the lower plate 3 to open the lower plate 3 outwards, and pull out the securing clip. In this case, since the thin wall portion 5 is formed on either side of the engaging clip 4, the engaging pawl 4 is easily flexed to easily release the attached state and detach the securing clip itself.

Moreover, when it is thereafter required to remove the securing clip from the fender protector 16, a free end portion of the resilient wall piece 9 formed with the upper engaging pawl 10 is lifted up by gripping the detachment gripping portion 14 protruded on the upper plate 7, so that the overlapped state between the upper engaging pawl 10 and the lower engaging pawl 11 is released. Thereby, the fender protector 16 is pulled out from the second fitting portion 1B of the securing clip, facilitating the detachment operation.

As described above, with this invention, employing the above constitution, the engagement wall formed on the second fitting portion is engaged with the regulation wall provided on the second panel member without causing a phenomenon of distortion between both, especially when the end portion of the second panel member is fitted into the second fitting portion of the securing clip. Even if the vehicle undergoes a wind resistance or water resistance, there is no fear that the second panel member falls off the first panel member.

What is claimed is:

1. A securing clip having an S-shaped cross-section formed by first and third free end segments, a second shared segment and two closed end portions for securing a first panel having a hole to a second panel having a hole and a regulating wall, the securing clip comprising:
    a first U-shaped fitting, formed by the first segment and the second segment and a first closed end portion, comprising a first engaging pawl on an inner wall of the first U-shaped fitting for engaging the hole in the first panel; and
    a second U-shaped fitting, formed by the third segment and the second segment and a second closed end portion, comprising:
        a pair of engagement walls and a resilient wall piece on said third segment, said resilient wall piece being separated from the pair of engagement walls by slits and extending from the free end of the third segment through the second closed end of the U shape such that a free end portion of the resilient wall piece extends beyond the second closed end;
        a second engaging pawl on an inner wall of the second segment for engaging the hole in the second panel;
        an engaging face that is on an end of each engagement wall and that faces an opening in the second closed end portion; and
        a third engaging pawl on an inner wall of the resilient wall piece and opposing said second engaging pawl, wherein the second engaging pawl and the third engaging pawl overlap close to one another vertically,
    the securing clip being arranged such that, when the second panel and the engagement wall are engaged, said engagement face of the engagement wall is inclined such that it is capable of engaging the regulating wall of the second panel to create a wedging effect to prevent detachment of the clip and the second panel, wherein the free end portion of the resilient wall is lifted to detach the second pawl from the hole in the second panel.

2. The securing clip according to claim 1, wherein the engagement wall exists in bilateral symmetry.

3. The securing clip according to claim 1, wherein said engagement face of the engagement wall is inclined with respect to a central axis of the U-character shape of the second fitting portion.

4. The securing clip according to claim 2, wherein said engagement face of the engagement wall is inclined with respect to a central axis of the U-character shape of the second fitting portion.

5. The securing clip according to claim 1, wherein a rib wall is protruded on an inner wall face of the second fitting portion.

6. The securing clip according to claim 2, wherein a rib wall is protruded on an inner wall face of the second fitting portion.

7. The clip of claim 1, further comprising a detachment grip integrally provided on an outside wall face at the opening end of the second U-shaped fitting.

8. The clip of claim 1, wherein said second engaging pawl comprises a pair of second engaging pawls receiving said first engaging pawl between the pair of second engaging pawls.

9. The clip of claim 1, wherein said third engaging pawl comprises a pair of third engaging pawls receiving said second engaging pawl between the pair of third engaging pawls.

* * * * *